| United States Patent [19] | [11] Patent Number: 4,938,180 |
| King | [45] Date of Patent: Jul. 3, 1990 |

[54] COLD START SYSTEM

[75] Inventor: James A. King, Schofield, Wis.

[73] Assignee: J. I. Case Company, Racine, Wis.

[21] Appl. No.: 325,713

[22] Filed: Mar. 20, 1989

[51] Int. Cl.$^5$ ............................................... F02M 1/16
[52] U.S. Cl. .............................. 123/180 T; 123/180 E
[58] Field of Search ........ 123/180 T, 180 E, 180 AC,
123/180 R, 187.5 R, 576, 179 G, 179 L

[56] References Cited

U.S. PATENT DOCUMENTS 3,189,014  6/1965  Kus ................................. 123/180 T
4,346,683  8/1982  Burke .......................... 123/180 AC
4,522,164  6/1985  Fränkle et al. .................. 123/180 T Primary Examiner—Andrew M. Dolinar
Attorney, Agent, or Firm—Dykema Gossett

[57] ABSTRACT

A cold start system is connected in an electrical circuit to a neutral start switch of a diesel powered vehicle. The electrical circuit includes a thermal switch and an electrical valve. The electrical valve is openable to permit communication between an ancillary fuel reservoir and the diesel engine manifold. The electrical valve opens only when the transmission is in neutral, the ancillary fuel switch is closed, and the thermal switch is not opened.

9 Claims, 1 Drawing Sheet

4,938,180

COLD START SYSTEM

FIELD OF THE INVENTION

The present invention pertains to a cold start system for vehicles, and more particularly, to a vehicle cold start system that introduces into the engine of the vehicle an ancillary, starting fuel with a lower flash point than that of a main fuel used by the vehicle. Still more particularly, the present invention relates to a cold start system that utilizes ancillary, starting fuels and includes a fail-safe device for preventing the use of the ancillary fuel beyond that use necessary for starting the engine.

BACKGROUND OF THE INVENTION

Motor vehicles, such as tractors, are powered by combustion processes which take place in the cylinders of the engines of the vehicles. The processes in gasoline engines involve ignition of a gasoline and air mixture by a spark. In diesel engines, the processes involve a spontaneous ignition of a mixture of diesel fuel and highly compressed heated air.

For the spontaneous combustion of diesel fuels to take place, the air must attain a temperature of 700–900 degrees F. This is because a diesel fuel has a temperature flash point that is relatively high among fuels. Thus, under cold weather conditions, the engine environment may have such heat loss or the engine may not be able to attain a high enough compression to sufficiently heat the air to the combustible temperatures required to ignite diesel fuel.

It has been known to use an ancillary fuel as a starting fuel to start the combustion process. Ether has long been the preferred ancillary fuel. It has a low flash point that is an advantage in starting the engine. But it causes an engine to run hot once started, which may be harmful to the engine. Moreover, because of its low flash point, combustion takes place prematurely during the engine power cycle as the engine heats up, which results in the piston being driven against the bottom of the cylinder rather than against a lubricant cushion. This is particularly true under load conditions when there is power removed from the engine, as when the vehicle is in a driving gear. Both the hot running of the engine and the driving of the piston against the bottom of the cylinder can cause accelerated engine wear.

Notwithstanding the effects of ether use, the vehicle operator may inject ether into the engine to obtain added power. Consequently, at least two systems have been developed to prevent accidental or intentional injection of ether into the engine once the engine is running.

One system that has been in use for some time involves use of a thermal switch on the engine block. According to this system, once the engine has warmed sufficiently, the thermal switch heats up and opens so as to open the operating circuit between the ether switch and the valve operated by the ether switch and through which the ether is injected into the engine manifold.

This system used alone, however, has a considerable disadvantage under cold engine operating conditions when the engine block has not warmed enough to open the thermal switch. Ether still could be injected into the manifold under load conditions.

A more current approach is to connect the ether switch to the cranking circuit so that ether can be injected only during engine starting. While this gives added protection, it too has a disadvantage. Under certain cold starting conditions, the engine may require ether to keep the engine running after disengagement of the cranking motor. But as ether can no longer be injected, the engine "dies", with a loss of cold starting performance.

OBJECTS OF THE INVENTION

Accordingly, it is the primary object of the present invention to provide a cold starting system that has peak performance cold starting.

It is another object of the invention to provide a cold starting system that performs well, even when the engine is still so cold as to require ancillary fuel to be injected after starting.

It is yet another object of the invention to provide a cold starting system that has peak cold starting performance but protects the engine against harmful effects of ancillary fuels, particularly when the engine is under load conditions.

SUMMARY OF THE INVENTION

According to the present invention, a neutral start switch mechanism is synchronized with the starting circuit by a disengaged or neutral posture of the transmission of an engine driven vehicle. The ancillary fuel or ether switch is connected to the neutral start switch in a circuit that includes a thermal switch and an electrical valve. The electrical valve is operable to permit communication between the ancillary fuel reservoir and the engine manifold. The electrical valve opens only when the transmission is in neutral so as to close the neutral start switch, the ancillary fuel switch is closed, and the thermal switch is not opened. This completes an ancillary fuel injection circuit. Accordingly, ether injection is prevented once the transmission is engaged, and accordingly, ether injection is prevented when the engine is under a load condition under which the engine might suffer greater harm from the ether fuel.

DESCRIPTION OF THE PREFERRED EMBODIMENT

Figure 1:
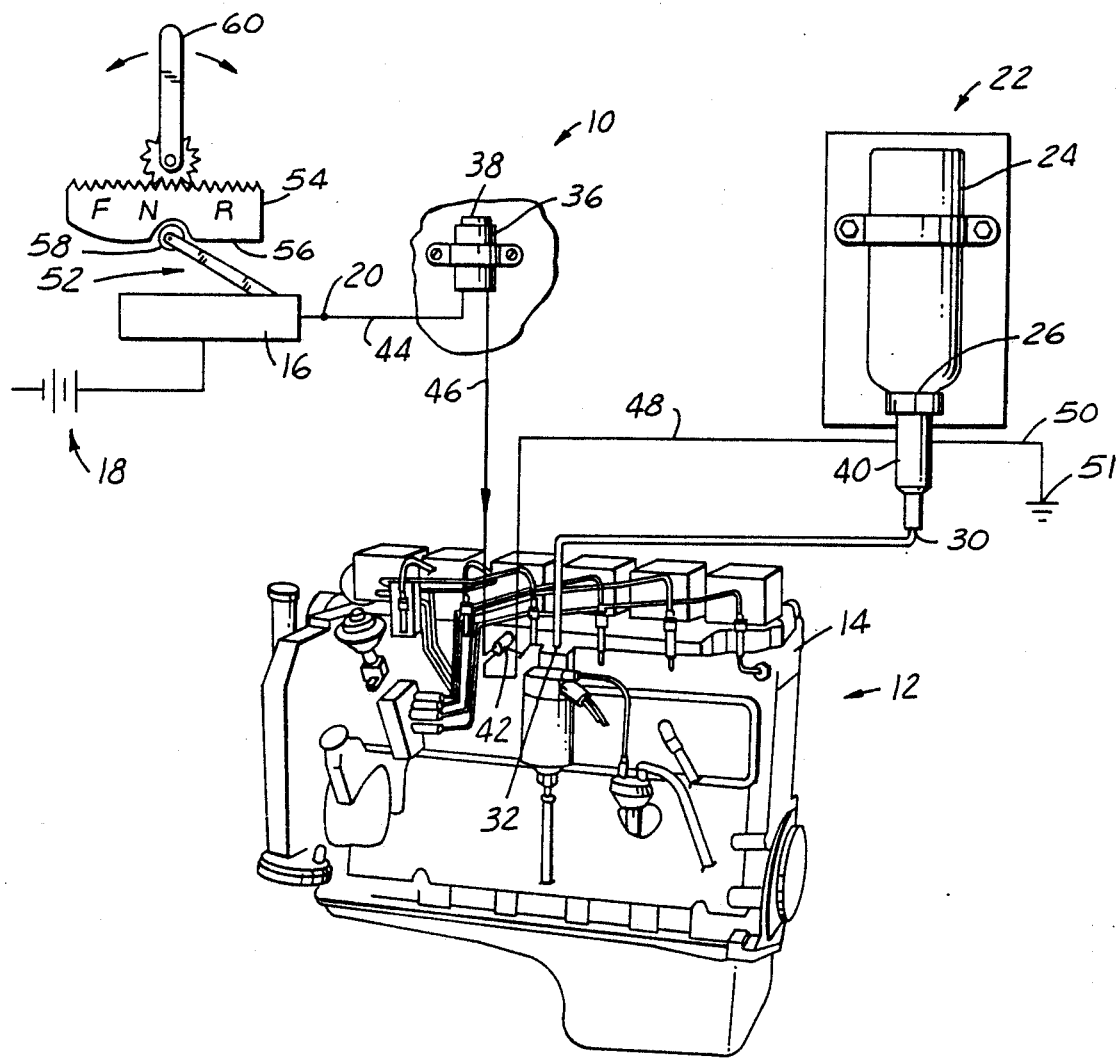
FIG. 1 is a schematic view of the cold start system that is the present invention.

The invention may be carried into practice in a number of ways, but one specific embodiment will be described by way of example only.

Referring now to the FIG. 1 wherein reference characters designate like or corresponding parts throughout the view, there is shown in the FIG. 1 a cold start system 10 for a motor vehicle, such as a tractor or the like, in combination with an internal combustion engine 12. Preferably, the internal combustion engine 12 is of the general class of engines well known to those of ordinary skill in the art that works by burning a mixture of fuel and air in a cylinder containing a piston. According to conventional knowledge of this class of engine, heat is produced, causing the air to expand and force down the piston to turn a crankshaft linked by gear means to the wheels of the motor vehicle. Because of the heat produced by the burning mixture of fuel, the engine is heated up to a predetermined temperature, that is, the heat produced by the burning mixture of fuel is transferred to the engine housing or block 14, which heats up over a range of measurable temperatures, at least one temperature of which can be used as a predetermined measurement.

Conventional engine power transmission systems are also well known by those of ordinary skill in the art. Such systems may be placed in a posture whereby interlinking gears of the previously mentioned gear means transmit power to the wheels of the vehicle to turn the wheels so that the vehicle moves forward or backward and with a predetermined torque applied to the live axle from which the wheels depend. Such systems may be also placed in a posture whereby the gears are not operatively linked to the crankshaft, so that the power generated by the piston's turning the crankshaft is not transmitted to the live axle of the wheel or some other inertially resisting structure. The transmission is in a relatively unloaded posture, or it is said to be in "neutral" as is understood by those of ordinary skill in the art.

In the preferred embodiment, a neutral start switch 16 is connected to the electrical power source 18 for the vehicle, for example, a conventional battery 18. Neutral start switch 16 may be closed only when the transmission system is in a neutral operating mode, which may in some systems include a "park" or starting mode. When neutral start switch 16 is closed, as shown in FIG. 1, engine 12 may be started Closing neutral start switch 16 also closes an electrical connection between the electrical power source 18 and an electrical output terminal 20.

The cold start system 10 includes an auxiliary fuel reservoir 22. Preferably ether is the auxiliary fuel, but any fuel having a relatively low flash point may be used, provided the fuel meets other standards set for the engine 12. Accordingly reservoir 22 includes ether bottle 24, which is strapped to the frame of the vehicle.

Reservoir 22 has an outlet 26, through which the auxiliary fuel may be fed out of bottle 24. An auxiliary fuel inlet conduit 28 has one end 30 communicating with reservoir outlet 26. Another end 32 of conduit 28 communicates with the air intake manifold of engine 12. Auxiliary fuel inlet conduit 28 is accordingly a pipe for conducting auxiliary fuel from reservoir 22 to the intake manifold of engine 12.

A means is provided in cold start system 10 for selecting the auxiliary fuel in addition to the main diesel fuel. The selection means chosen for the preferred embodiment is an electrical switch 36, which is mounted on a panel adjacent the operator of the vehicle in which it is mounted. Switch 36 may be closed by pushing a button 38. When button 38 is pushed, the selection means or electrical switch 36 is in its operating mode. Preferably, this operating mode is operative only when neutral start switch 16 closes a circuit by which electrical current may be transmitted to electrical switch 36. As thus far disclosed, this is only when the transmission system is in neutral. Auxiliary fuel is released from auxiliary fuel reservoir 22 only when the auxiliary fuel selection means 36 is in its operating mode, that is, when switch 36 is closed, for example by pushing button 38.

An electrically operable, outlet valve 40 is connected to reservoir outlet 26. Valve 40 may be mechanically connected to reservoir outlet 26, for example, by being threadably received onto the mouth of bottle 24. In its normal operating mode, valve 40 closes off reservoir outlet 26. When auxiliary fuel selection means 36 is in its operating mode, that is, switch 36 is closed, valve 40 responds by opening to open reservoir outlet 26. The response is to electrical power from electrical power source 18 being transmitted when auxiliary fuel switch 36 is closed and a thermostatic switch 42, now to be explained, is closed.

Thermostatic switch 42 is a heat responsive, shut-off means for closing off communication between auxiliary fuel reservoir outlet 26 and auxiliary fuel inlet conduit 28 when the engine 12 heats up to the predetermined temperature. When the engine 12 heats up to the predetermined temperature, thermostatic switch 42, which is in a closed, default operating mode, opens to cause valve 40 to close. Thermostatic switch 42 stays open at temperatures exceeding the predetermined temperature.

A number of connecting devices operatively connect the elements of cold start system 10. Where the elements are electrically operable, the connecting devices are connecting electrical wires 44, 46, 48 and 50. Those of ordinary skill in the art will appreciate that an electrical circuit must be completed to ground to make the system operable. Accordingly, ground 51 is provided as an attachment of electrical wire 50 to the chassis of the vehicle.

A means is provided for preventing accidental or intentional release of auxiliary fuel from reservoir 22. The means renders auxiliary fuel selection means 36 inoperative when the transmission system is in a posture in which power is transmitted from engine 12. As has been disclosed, the neutral start switch does not permit starting of engine 12 unless the transmission system is in neutral. It has also been disclosed that switch 36 is operative only when neutral start switch 16 closes a circuit by which electrical current may be transmitted to electrical switch 36. Accordingly, a bypass means is provided for closing an electrical connection between electrical power source 18 and electrical output terminal 20 when the transmission system is in neutral. The bypass means is a cam operated switch member 52 that is connected to neutral start switch 16. The transmission system has a cam linkage 54. Cam linkage 54 has a camming edge 56 that contacts a cam follower 58, which is a part of cam member 52. Cam edge 56 is structured to cam open switch 16 when the transmission system is in other than a neutral operating mode. Positioning of the cam edge may be accomplished by means of a rack and pinion linkage to a gear shift lever 60, although other linkages known to those of skill in the art may also be used.

Accordingly, the invention has been disclosed whereby when the start means of a vehicle is operative, even after starting the vehicle, and the transmission is in a posture in which power is not transmitted from the engine of the vehicle, an auxiliary fuel selection means may be operated to open an outlet valve so that auxiliary starting fuel may be injected into the engine at temperatures below a predetermined temperature at which the auxiliary fuel can no longer be injected into the engine.

I claim:

1. A cold start system in combination with an internal combustion engine which is capable of heating up to a predetermined temperature and in which a manifold is connected to inlet ducts for cylinders of the engine, and a start switch means connected to a transmission means and having at least one start operating mode for permitting starting of the internal combustion engine, the cold start system comprising:

an auxiliary fuel reservoir having a reservoir outlet for feeding auxiliary fuel therethrough;

an auxiliary fuel selection means having at least one operating mode which is operative only when said start switch means is in said at least one start operating mode, said auxiliary fuel being releasable from said auxiliary fuel reservoir only when said auxiliary fuel selection means is in said operating mode;

an outlet valve connected to the reservoir outlet and closing said reservoir outlet, the outlet valve being openable to open said reservoir outlet responsively to said auxiliary fuel selection means being in said operating mode;

an auxiliary fuel inlet conduit having one end communicating with said reservoir outlet and having another end communicating with said manifold, said auxiliary fuel inlet conduit for conducting auxiliary fuel from said reservoir to said manifold;

a heat responsive, shut-off means for closing off communication between said auxiliary fuel reservoir outlet and said auxiliary fuel inlet conduit; and preventive means for rendering said auxiliary fuel selection means inoperative when said transmission means is in a posture in which power may be transmitted from the engine, whereby when the start switch means is operative and said transmission is in a posture in which power is not transmitted from the engine, said auxiliary fuel selection means may be operated to open said outlet valve at temperatures below said predetermined temperature.

2. The cold start system in the combination of claim 1 wherein said auxiliary fuel inlet conduit has one end connected to said outlet valve and another end connected to said manifold for conducting said auxiliary fuel from said outlet valve to said manifold.

3. The cold start system in the combination of claim 2 wherein, when said outlet valve is open, said outlet valve closes responsively to said heat responsive, shut-off means to close off said reservoir outlet when said engine reaches said predetermined temperature.

4. The cold start system in the combination of claim 3 wherein the start switch means is a neutral start switch and the heat responsive, shut-off means is a thermostatic switch.

5. The cold start system in the combination of claim 4 wherein said engine is housed in an engine block and said predetermined temperature is a temperature of the engine block and said thermostatic switch is surface mounted on said engine block.

6. A cold start system in combination with an internal combustion engine, said engine having a conduit to a manifold extending through said engine and said engine being capable of heating up to a predetermined temperature, said cold start system being further in combination with a transmission system, said transmission system being characterized by having at least one neutral operating mode, and still further in combination with a neutral start switch connected to an electrical power source, said neutral start switch being closable only when said transmission system is in said at least one neutral operating mode and, when closed, permitting starting said engine and closing an electrical connection between said electrical power source and an electrical output terminal, said cold start system comprising:

a first electrical connecting wire connected to said electrical output terminal;

an auxiliary fuel reservoir having a reservoir outlet for feeding auxiliary fuel therethrough;

an auxiliary fuel electrical switch connected to said first connecting electrical wire;

a second connecting wire connected to said auxiliary fuel electrical switch;

a thermostatic switch connected to said second connecting wire, said thermostatic switch opening when said predetermined temperature is reached and staying open at temperatures exceeding said predetermined temperature;

a third connecting wire connected to said thermostatic switch;

an electrically operable valve being mechanically connected to said reservoir outlet so as to close said reservoir outlet and being electrically connected to said third connecting wire so as to be open responsively to electrical power from said electrical power source being transmitted when said auxiliary fuel switch is closed and said thermostatic switch is closed;

an auxiliary fuel inlet conduit having one end communicating with said reservoir outlet and having another end having one end communicating with said manifold, said auxiliary fuel inlet conduit for conducting auxiliary fuel from said reservoir to said manifold when said electrically operable valve is open; and bypass means for closing said electrical connection between said electrical power source and said electrical output terminal when said neutral start switch is in a position to permit starting of said engine and said transmission system is in said at least one neutral operating mode, whereby said auxiliary fuel electrical switch may be closed to open said electrically operable valve at temperatures below said predetermined temperature.

7. The cold start system in the combination of claim 6 wherein said bypass means is a cam operated member connected to said neutral start switch, said transmission having a cam linkage contacting said cam member to cam said switch open when said transmission system is in other than a neutral operating mode.

8. The cold start system in the combination of claim 7 wherein said auxiliary fuel inlet conduit has one end connected to said electrically operable valve and another end connected to said manifold for conducting said auxiliary fuel from said electrically operable valve to said manifold.

9. The cold start system in the combination of claim 8 wherein said engine is housed in an engine block, said predetermined temperature is a temperature of the engine block, and said thermostatic switch is surface mounted on said engine block.

* * * * *